(12) United States Patent
Cheng et al.

(10) Patent No.: US 7,656,659 B2
(45) Date of Patent: Feb. 2, 2010

(54) NOTEBOOK COMPUTER WITH THERMAL MODULE

(75) Inventors: Nien-Tien Cheng, Taipei Hsien (TW);
Yung-Fa Cheng, Taipei Hsien (TW);
Ching-Bai Hwang, Taipei Hsien (TW);
Zhi-Hui Zhao, Shenzhen (CN);
Rung-An Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/235,609

(22) Filed: Sep. 23, 2008

(65) Prior Publication Data

US 2009/0284912 A1    Nov. 19, 2009

(30) Foreign Application Priority Data

May 14, 2008    (FR)    .......................... 200810067165

(51) Int. Cl.
*H05K 7/20*    (2006.01)
(52) U.S. Cl. .................. 361/679.48; 361/694; 361/695; 361/700
(58) Field of Classification Search ............ 361/679.47, 361/679.48, 679.49, 694, 695, 700
See application file for complete search history.

(56) References Cited

U.S. PATENT DOCUMENTS

| | | | | |
|---|---|---|---|---|
| 5,523,918 A * | 6/1996 | Chiou | .......................... | 361/695 |
| 5,676,523 A * | 10/1997 | Lee | ............................ | 415/206 |
| 6,141,218 A * | 10/2000 | Miyahara | .................... | 361/695 |
| 6,252,770 B1 * | 6/2001 | Yu et al. | ..................... | 361/695 |
| 7,019,970 B2 * | 3/2006 | Tanaka et al. | ............... | 361/695 |
| 7,511,956 B2 * | 3/2009 | Tomioka et al. | ............. | 361/697 |
| 7,532,470 B2 * | 5/2009 | Ariga | .......................... | 361/695 |
| 2008/0043436 A1 * | 2/2008 | Hung et al. | ................. | 361/700 |
| 2009/0002945 A1 * | 1/2009 | Kenny | ......................... | 361/695 |
| 2009/0122485 A1 * | 5/2009 | Chen | .......................... | 361/695 |

* cited by examiner

*Primary Examiner*—Gregory D Thompson
(74) *Attorney, Agent, or Firm*—Frank R. Niranjan

(57) ABSTRACT

A notebook computer (1000) includes a base (100), a cover (300), a computer printed circuit board (PCB) (200) and a centrifugal fan (40). The cover covers the base, and cooperates with the base to form a receiving space (500) therebetween. The computer PCB is received in the receiving space and mounted on the base. The centrifugal fan is received in the receiving space, and includes a stator (401) and an impeller (402), rotatable with respect to the stator. The stator includes a motor (415) and a fan PCB (405) directly attached to the base. The motor electrically connects to the fan PCB. When the impeller rotates, airflow enters the receiving space through top and bottom air inlets (304, 104). The fan PCB is integrally formed with the computer PCB and has a height less than the computer PCB.

20 Claims, 5 Drawing Sheets

NOTEBOOK COMPUTER WITH THERMAL MODULE

BACKGROUND

1. Technical Field

The present invention generally relates to portable electronic devices, and particularly to a notebook computer having a thermal module for dissipating heat generated by electronic components in the notebook computer.

2. Description of Related Art

With the continuing development of technology, notebook computers have become a widely used part of daily life. It is well known that heat is generated by electronic components such as integrated circuit chips in notebook computers during normal operation. If the heat is not efficiently removed, these electronic components may suffer damage. Thus, centrifugal fans are often used to cool the electronic components.

A typical notebook computer includes a main body and a display unit hinging with the main body at a rear side thereof. The main body includes a base and a cover on the base. The base and the cover cooperatively form a receiving space therebetween. A centrifugal fan is received in the receiving space, and includes a frame and an impeller received in the frame. The frame has a bottom plate, a sidewall extending upwardly from the bottom plate and a top plate covering the sidewall. The top plate defines a top air inlet therein, and the bottom plate defines a bottom air inlet therein. During assembly, the top and the bottom plates of the centrifugal fan are required to define a gap from the cover and the base of the main body, respectively, allowing airflow into the centrifugal fan through the top and bottom air inlets.

However, such a gap between the centrifugal fan and the main body increases a height of the notebook computer, thereby compromising the standard requirements for a compact profile thereof.

What is needed, therefore, is a notebook computer which overcomes the described limitations.

SUMMARY

A notebook computer according to an embodiment of the present invention includes a base, a cover, a computer printed circuit board (PCB) and a centrifugal fan. The cover covers the base, and cooperates with the base to form a receiving space therebetween. The computer PCB is received in the receiving space and mounted on the base. The centrifugal fan is received in the receiving space, and includes a stator and an impeller, rotatable with respect to the stator. The stator includes a motor and a fan PCB directly attached to the base. The motor electrically connects to the fan PCB. When the impeller rotates, airflow enters the receiving space through top and bottom air inlets. The fan PCB is integrally formed with the computer PCB and has a height less than the computer PCB.

Other advantages and novel features of the present invention will become more apparent from the following detailed description when taken in conjunction with the accompanying drawings.

BRIEF DESCRIPTION OF THE DRAWINGS

Many aspects of the present notebook computer can be better understood with reference to the following drawings. The components in the drawings are not necessarily drawn to scale, the emphasis instead being placed upon clearly illustrating the principles of the disclosed notebook computer. Moreover, in the drawings, like reference numerals designate corresponding parts throughout the several views.

DETAILED DESCRIPTION OF THE EMBODIMENTS

Figure 1:
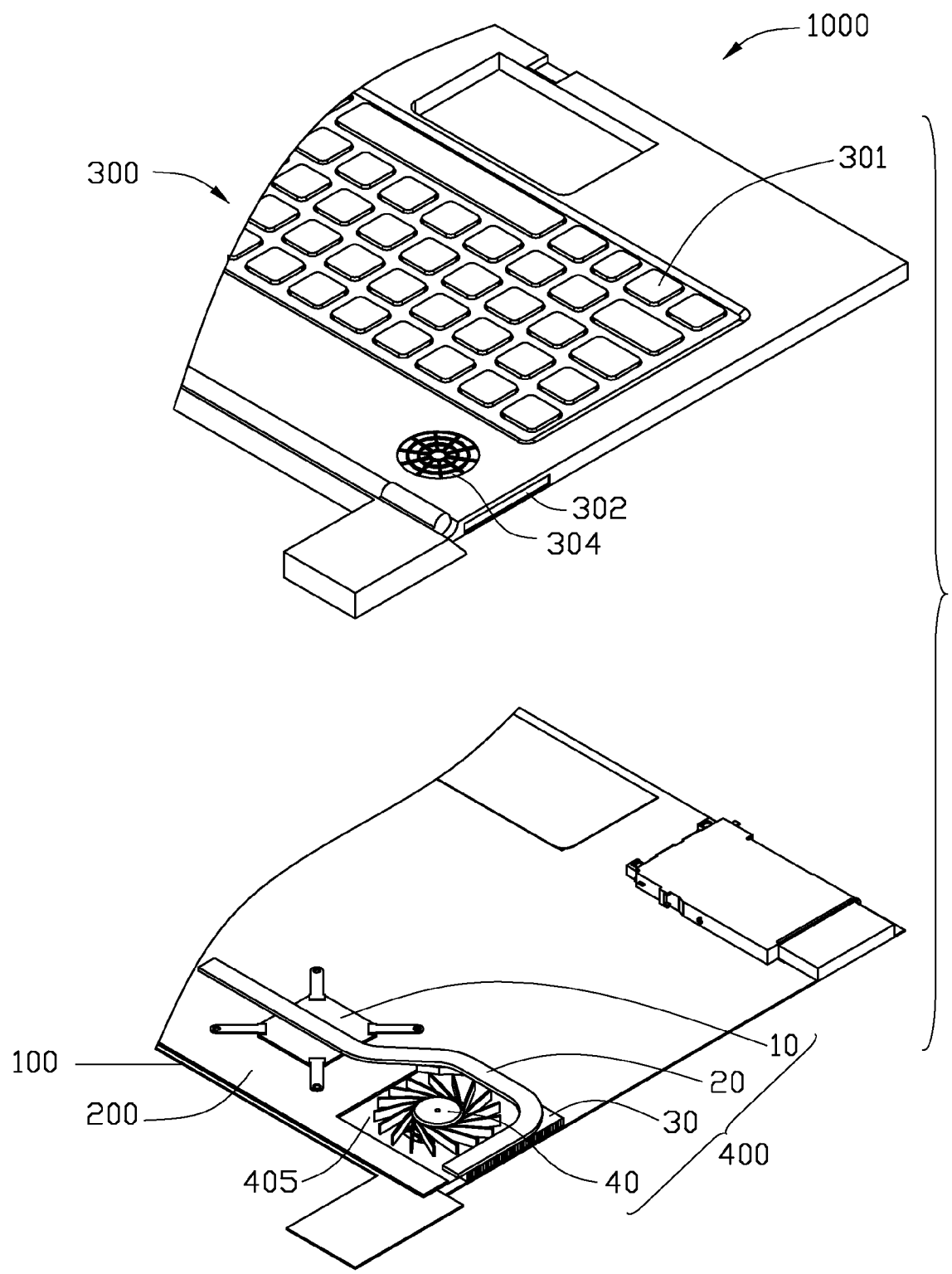
FIG. 1 is an exploded, isometric view of a notebook computer in accordance with an embodiment of the present invention.
Figure 5:
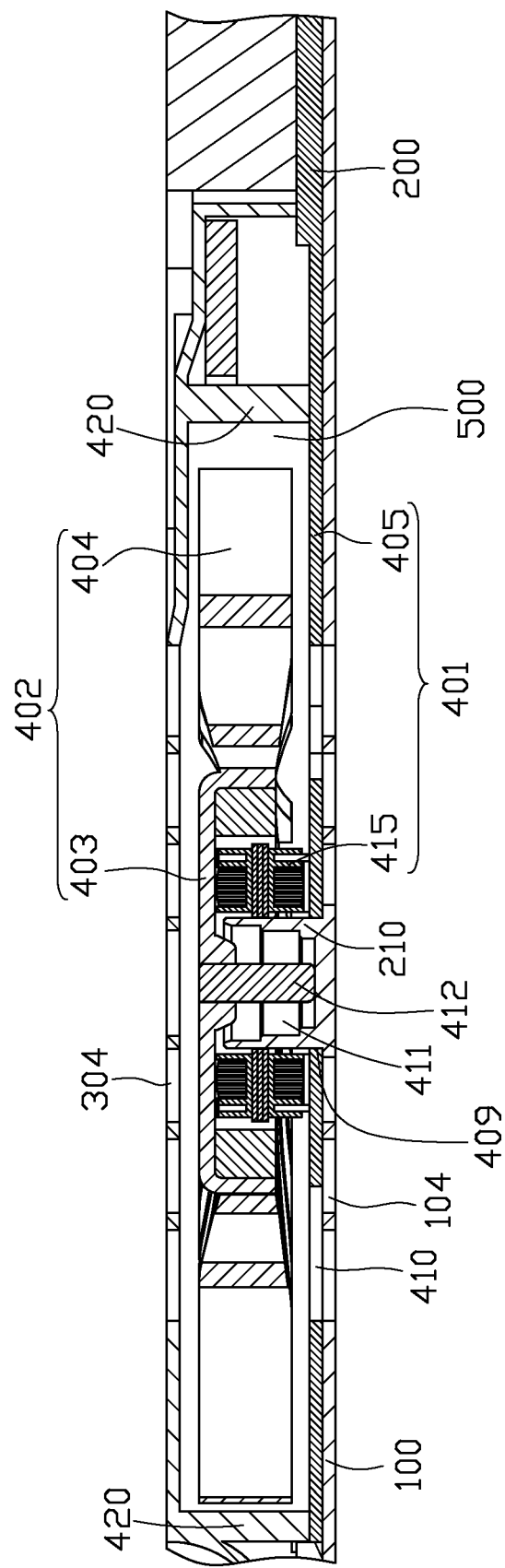
FIG. 5 is a cross-section of the notebook computer of FIG. 4, taken along line V-V thereof.

Referring to FIG. 1, a notebook computer 1000 includes a base 100, a computer printed circuit board (PCB) 200 attached to the base 100, a thermal module 400 attached to the computer PCB 200, and a cover 300 covering the base 100. The base 100 and the cover 300 cooperatively form a receiving space 500 (shown in FIG. 5) receiving the computer PCB 200 and the thermal module 400 therein.

Figure 2:
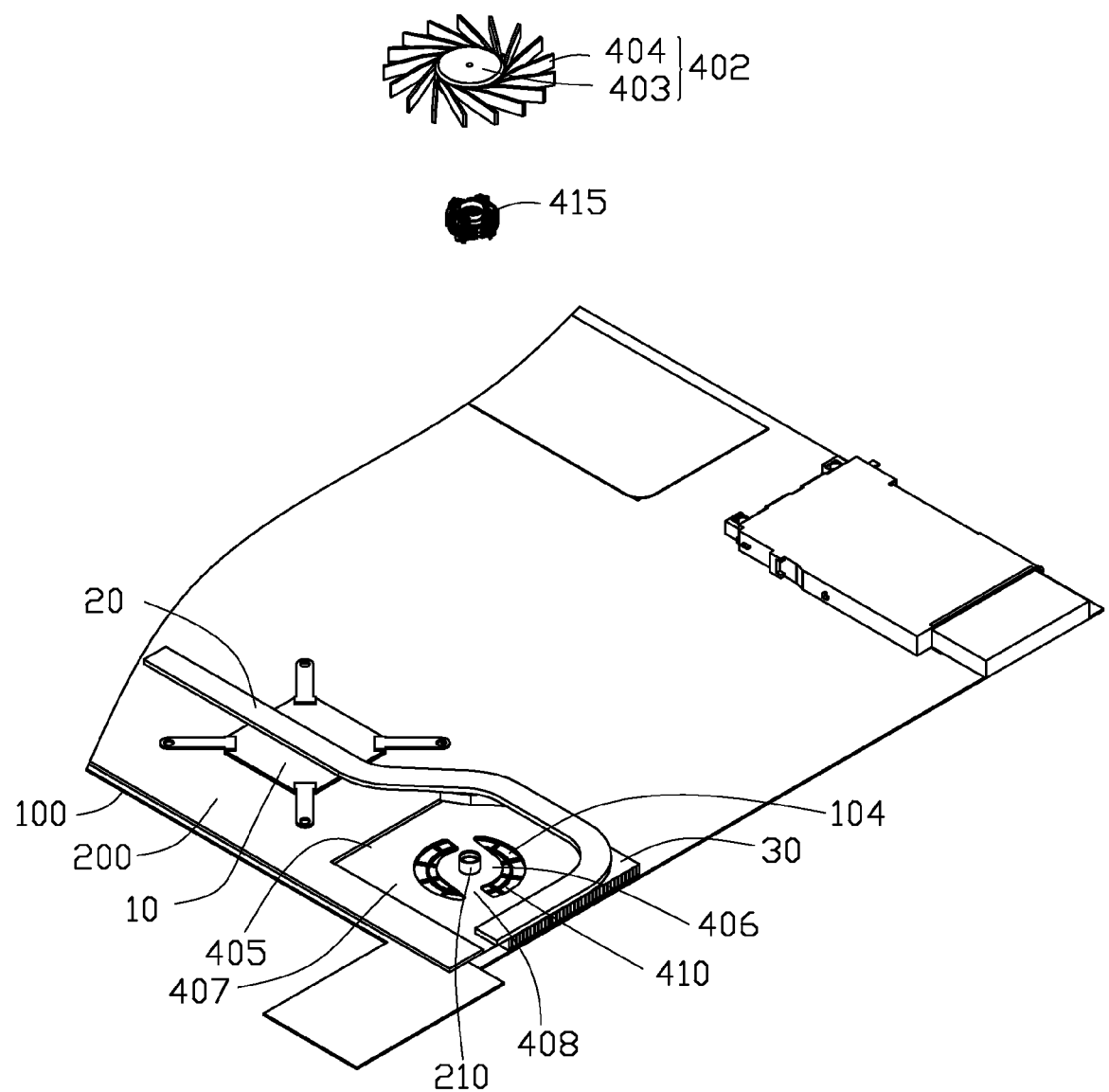
FIG. 2 is an exploded, isometric view of a base the notebook computer of FIG. 1.
Figure 3:
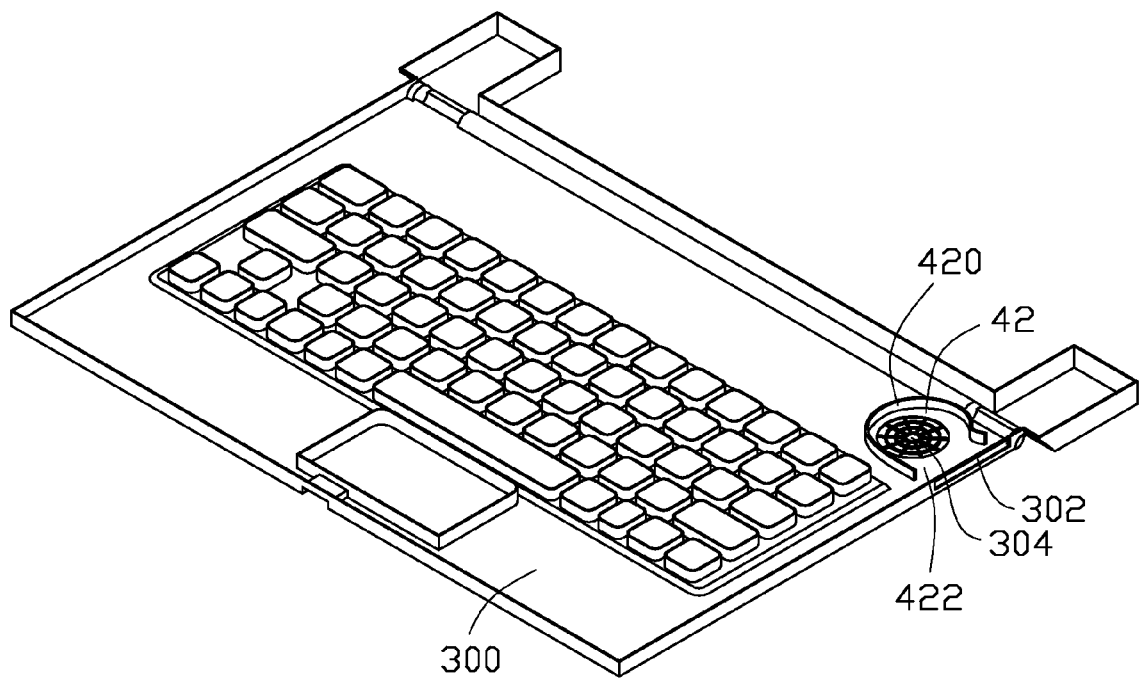
FIG. 3 is an inverted, isometric view of a cover of the notebook computer of FIG. 1.
Figure 4:
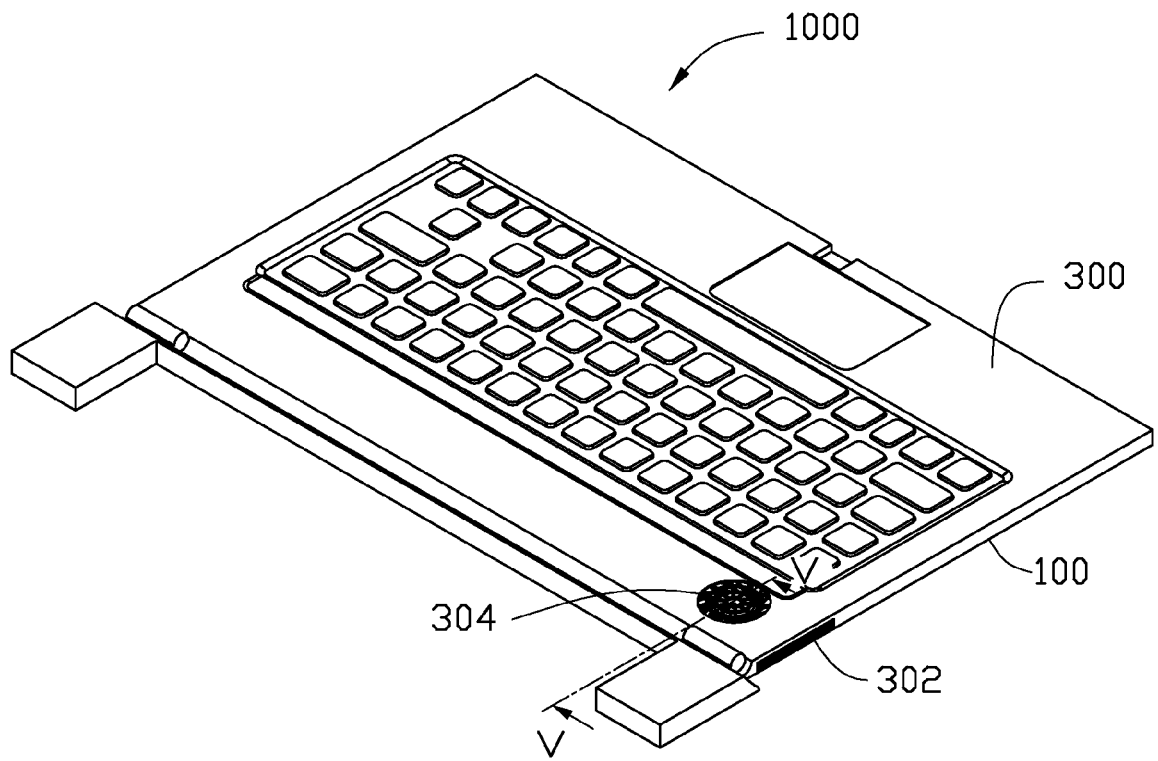
FIG. 4 is an assembled, isometric view of the notebook computer of FIG. 1.

Referring to FIG. 2, the base 100 is in the form of a plate, and defines a bottom air inlet 104 at a corner thereof, allowing airflow into the notebook computer 1000. The bottom air inlet 104 is reticular, in order to prevent dust from entering the notebook computer 1000 as much as possible.

The thermal module 400 includes a heat spreader 10, a heat pipe 20, a fin assembly 30, and a centrifugal fan 40. The heat spreader 10, optimizes heat conduction, and thermally connects with a heat generating component (not shown) mounted on the computer PCB 200. The heat pipe 20 has one end attached to the heat spreader 10, and another end attached to the fin assembly 30. The centrifugal fan 40 produces an airflow flowing through the fin assembly 30 to disperse heat therefrom.

The centrifugal fan 40 is located at the corner of the base 100 where the bottom air inlet 104 is defined, and includes a stator 401 (shown in FIG. 5) and an impeller 402, rotatable with respect to the stator 401. The impeller 402 aligns with the bottom air inlet 104, and includes a hub 403, a plurality of blades 404 extending radially and outwardly from the hub 403, and a shaft 412 (shown in FIG. 5) extending downwardly from a center of the hub 403.

The stator 401 includes a fan PCB 405 and a motor 415 electrically connecting with the fan PCB 405. The fan PCB 405 is integrally formed with the computer PCB 200 as a single piece, and has a height less than that of the computer PCB 200, so that a recess 407 is defined above the fan PCB 405 relative to the computer PCB 200. In other words, the fan PCB 405 is an integral portion of the computer PCB 200. A bottom portion of the impeller 402 is embedded in the recess 407 when the impeller 402 is mounted to the fan PCB 405 (shown in FIG. 5). The fan PCB 405 is intimately attached to the base 100. The fan PCB 405 defines a round central hole 409 (shown in FIG. 5) at a center thereof and two arcuate air intakes 410 surrounding the central hole 409. The air intakes 410 align with the bottom air inlet 104 of the base 100, so that airflow can pass through the air inlet 104 and the air intakes 410. The central hole 409 and the air intakes 410 are spaced from each other by a mounting seat 406 and two ribs 408. The mounting seat 406 is annular, and jointed with the fan PCB 405 by the two ribs 408.

A central tube 210 extends vertically and upwardly from, and is integrally formed with, the base 100. The central tube 210 passes through the central hole 409 of the fan PCB 405. The central tube 210 receives a bearing 411 (shown in FIG. 5) therein, seated in which is the shaft 412 of the impeller 402.

Referring to FIGS. 1-4, the cover 300 is semi-enclosed, and forms a keyboard 301 at a top surface thereof, via which signals can be input. The cover 300 defines a round top air inlet 304 at a corner thereof, allowing airflow into the notebook computer 1000. The top air inlet 304 is also reticular, aligning with the bottom air inlet 104 of the base 100. A sidewall 420 extends vertically downward from the cover 300 towards the base 100. The sidewall is integrally formed with the cover 300 as a single piece around the top air inlet 304. The sidewall 420 abuts the fan PCB 405 when the cover 300 is mounted to the base 100 (shown in FIG. 5). The sidewall 420 is volute, and matches an outer periphery of the impeller 402. The sidewall 420 and the cover 300 cooperatively form a receiving chamber 42 therebetween, receiving the impeller 402 therein. The sidewall 420 defines an air outlet 422 facing a lateral side of the cover 300. The fin assembly 30 is mounted on the base 100 and disposed at the air outlet 422. The cover 300 further defines an air vent 302 at the lateral side thereof, and the air vent 302 aligns and communicates with the air outlet 422.

During operation of the centrifugal fan 40, the ambient airflow enters the receiving chamber 42 between the sidewall 420, the base 100 and the cover 300 from the top and the bottom air inlets 304, 104, and then flows towards the air outlet 422 and through the fin assembly 30. The airflow then exits the notebook computer 1000 through the air vent 302, thus dispersing heat from the fin assembly 30 into the ambient atmosphere.

In the notebook computer 1000, the fan PCB 405 of the stator 401 is directly attached to the base 100, the sidewall 420 extends integrally from the cover 300, and the centrifugal fan 40 is received in the receiving chamber 42 between the sidewall 420 and the cover 300. Thus, there is no need to provide additional top and bottom plates as typically required in conventional centrifugal fans. Production costs of the notebook computer 1000 are reduced and overall structure thereof is simplified. As well, height of the notebook computer 1000 is accordingly reduced due to omission of the top and bottom plates for the centrifugal fan 40, and integral formation of the fan PCB 405 with the computer PCB 200 as a single piece further reduces the production cost of the notebook computer 1000.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A notebook computer, comprising:
    a base;
    a cover covering the base, the cover and the base cooperatively forming a receiving space therebetween;
    a computer printed circuit board (PCB) received in the receiving space and mounted on the base; and
    a centrifugal fan received in the receiving space, and comprising a stator and an impeller rotatable with respect to the stator, the stator comprising a motor and a fan PCB directly attached to the base, the motor electrically connecting to the fan PCB, with at least one of the base and the cover provided with an air inlet, through which airflow enters the receiving space when the impeller rotates.

2. The notebook computer of claim 1, wherein a sidewall extends integrally from the cover towards the base, the sidewall and the cover cooperatively forming a receiving chamber therebetween, in which the impeller is received.

3. The notebook computer of claim 2, wherein the sidewall abuts the fan PCB.

4. The notebook computer of claim 2, wherein the sidewall defines an air outlet facing a lateral side of the cover, and a fin assembly is disposed at the air outlet.

5. The notebook computer of claim 4, wherein the cover defines an air vent at the lateral side thereof and the air vent is aligned with the air outlet.

6. The notebook computer of claim 1, wherein the air inlet includes a top air inlet defined in the cover.

7. The notebook computer of claim 1, wherein the air inlet includes a bottom air inlet defined in the base and aligned with the impeller.

8. The notebook computer of claim 1, wherein the air inlet includes a top air inlet defined in the cover and a bottom air inlet defined in the base, the top and the bottom air inlet aligning with each other.

9. The notebook computer of claim 8, wherein the fan PCB defines at least one air intake aligning with the bottom air inlet.

10. The notebook computer of claim 1, wherein a central tube extends upwardly from the base and passes through the fan PCB, with the motor mounted thereon.

11. The notebook computer of claim 1, wherein the fan PCB is integrally formed with the computer PCB as a single piece.

12. The notebook computer of claim 11, wherein the fan PCB has a height less than that of the computer PCB, and a recess is defined above the fan PCB relative to the computer PCB, with a bottom portion of the impeller received in the recess.

13. A notebook computer, comprising:
    a base;
    a cover covering the base, the cover and the base cooperatively forming a receiving space therebetween;
    a keyboard mounted on the cover;
    a computer printed circuit board (PCB) received in the receiving space and mounted on the base; and
    a centrifugal fan received in the receiving space, and comprising a stator and an impeller rotatable with respect to the stator, the stator comprising a motor and a fan PCB integrally formed with the computer PCB as a monolithic piece and directly attached to the base, the motor electrically connecting to the fan PCB, with at least one of the base and the cover provided with an air inlet, through which airflow enters the receiving space when the impeller rotates;
    wherein a recess is defined above the fan PCB and surrounded by the computer PCB.

14. The notebook computer of claim 13, wherein a sidewall extends integrally from the cover towards the base, the sidewall and the cover cooperatively forming a receiving chamber therebetween, in which the impeller is received.

15. The notebook computer of claim 14, wherein the sidewall abuts the fan PCB.

16. The notebook computer of claim 13, wherein the air inlet includes a top air inlet defined in the cover.

17. The notebook computer of claim 13, wherein the air inlet includes a bottom air inlet defined in the base and aligned with the impeller.

18. The notebook computer of claim 13, wherein the air inlet includes a top air inlet defined in the cover and a bottom air inlet defined in the base, the top and the bottom air inlet aligning with each other.

19. The notebook computer of claim 18, wherein the fan PCB defines at least one air intake aligning with the bottom air inlet.

20. The notebook computer of claim 13, wherein a bottom portion of the impeller is received in the recess.

* * * * *